(12) United States Patent
Lankalapalli et al.

(10) Patent No.: US 11,617,065 B2
(45) Date of Patent: Mar. 28, 2023

(54) SYSTEM AND METHOD FOR REMOTE PROFILE PROVISIONING

(71) Applicant: JIO PLATFORMS LIMITED, Ahmedabad (IN)

(72) Inventors: Dhananjaya Lankalapalli, Thane (IN); Ganesh Mote, Mumbai (IN); Ashwani Thaman, Navi Mumbai (IN); Shyam Maheshwari, Navi Mumbai (IN); Ganesh Krishnadoss, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 17/008,367

(22) Filed: Aug. 31, 2020

(65) Prior Publication Data
US 2021/0067931 A1 Mar. 4, 2021

(30) Foreign Application Priority Data

Aug. 30, 2019 (IN) .............................. 201921035142

(51) Int. Cl.
*G06F 15/177* (2006.01)
*H04W 4/50* (2018.01)
(Continued)

(52) U.S. Cl.
CPC ............... *H04W 4/50* (2018.02); *G16Y 10/75* (2020.01); *H04L 67/025* (2013.01);
(Continued)

(58) Field of Classification Search
None
See application file for complete search history.

(56) References Cited

U.S. PATENT DOCUMENTS

| 2013/0095809 A1* | 4/2013 | Wieczorek | ............ H04W 76/00 455/418 |
| 2016/0021529 A1* | 1/2016 | Park | ...................... H04W 12/35 455/410 |

(Continued)

*Primary Examiner* — Brian Whipple
*Assistant Examiner* — Gregory P Tolchinsky
(74) *Attorney, Agent, or Firm* — Klarquist Sparkman, LLP

(57) ABSTRACT

A system and method for remote profile provisioning. The method comprises activating, via an eUICC [202], a machine-to-machine (M2M) polling unit [204] based on a limited connectivity for HTTP service enabled via a mobile network operator (MNO) [104], wherein the limited connectivity for HTTP service is enabled based on an activation of a bootstrap profile. Thereafter the method encompasses establishing, via the M2M polling unit [204], an HTTP channel between the eUICC [202] and a subscription manager-secure routing (SM-SR) [106]. The method further comprises receiving, at the eUICC [202] via a transceiver unit [206] from the SM-SR [106], an operational profile over the established HTTP channel. Thereafter the method encompasses retrieving, at the eUICC [202], the operational profile with at least a new MSISDN. Further, the method comprises enabling, at the eUICC [202], the retrieved operational profile for remote SIM profile provisioning management.

13 Claims, 5 Drawing Sheets

(51) Int. Cl.
  *H04L 67/025* (2022.01)
  *H04W 8/18* (2009.01)
  *H04W 4/70* (2018.01)
  *G16Y 10/75* (2020.01)
  *H04L 67/141* (2022.01)
(52) U.S. Cl.
  CPC ............ *H04L 67/141* (2013.01); *H04W 4/70* (2018.02); *H04W 8/18* (2013.01)

(56) References Cited

U.S. PATENT DOCUMENTS

| | | | |
|---|---|---|---|
| 2016/0149903 A1* | 5/2016 | Suh | H04L 63/0853 713/156 |
| 2016/0330608 A1* | 11/2016 | Benn | H04W 12/35 |
| 2017/0188230 A1* | 6/2017 | Danree | H04W 8/18 |
| 2018/0004736 A1* | 1/2018 | Zhao | H04B 1/38 |
| 2020/0021973 A1* | 1/2020 | Anslot | H04L 61/2061 |
| 2020/0050753 A1* | 2/2020 | Davis | G01R 19/2513 |
| 2020/0220983 A1* | 7/2020 | Hu | H04L 12/1407 |
| 2020/0236529 A1* | 7/2020 | Anslot | H04W 60/00 |
| 2020/0252791 A1* | 8/2020 | Hamblet | H04W 8/18 |

* cited by examiner

SYSTEM AND METHOD FOR REMOTE PROFILE PROVISIONING

CROSS REFERENCE TO RELATED APPLICATIONS

This application claims priority to Indian Patent Application No. 201921035142, filed Aug. 30, 2019, the disclosure of which is hereby incorporated by reference herein in its entirety.

TECHNICAL FIELD

The present disclosure relates to the field of wireless network and more particularly to a system and method for remote SIM (Subscriber Identity Module) profile provisioning management in machine to machine (M2M)/Internet of Things (IoT) devices.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

A number of technologies have been evolved in the field of wireless network over the past few years. For instance, it is now possible to communicate and to perform certain tasks digitally, at any instant of time and from any location, using various electronic devices. Various type of electronic devices are available and used to perform various tasks, including machine-to-machine or M2M type devices. The M2M type devices support any technology that enables networked devices to exchange information and perform actions without the manual assistance of humans. Further, Artificial intelligence (AI) and Machine Learning (ML) facilitate the communication between systems/M2M devices, allowing them to make their own autonomous choices. The main purpose of machine-to-machine technology is to tap into sensor data and transmit it to a network. For example, in product restocking, a vending machine can message the distributor's network, or machine, when a particular item is running low to send a refill. Thus, as an enabler of asset tracking and monitoring, M2M is vital in warehouse management systems (WMS) and supply chain management (SCM). Unlike SCADA or other remote monitoring tools, M2M systems often use public networks and access methods, for example, cellular or Ethernet, etc. to make it more cost-effective. Machine-to-machine communication is often used for remote monitoring.

Also, an M2M SIM is easily accessible within an IoT-connected device. For instance, the M2M SIM could be positioned deep inside a car dashboard and, potentially go from country to another country with supply chain. The business benefits of the M2M devices being able to receive an operational profile over the air are considerable and there are benefits of having the ability to amend that operational profile, to upgrade it, or even to switch it completely for another.

A SIM (subscriber identification module) circuit is part of the function of a Universal Integrated Circuit Card (UICC) physical smart card, which is usually made of PVC with embedded contacts and semiconductors. "SIM cards" are designed to be transferable between different mobile devices. A typical SIM (subscriber identification module) card ecosystem comprises of an integrated circuit chip that is intended to securely store the international mobile subscriber identity (IMSI) number and its related key, which are used to identify and authenticate subscribers on mobile telephony devices (such as mobility devices like the smartphones, tabs, laptops, computers, M2M, etc.). The SIM cards have been used in GSM smartphones, CDMA smartphones, LTE-capable handsets and coming 5G handsets.

A universal integrated circuit card (UICC), which is a smart card inserted into a mobile communication terminal, stores personal information of a mobile communication subscriber, such as network access authentication information, a phone number list, and an SMS, and performs subscriber authentication and traffic security key generation when a connection is made to a mobile communication network, such as GSM, WCDMA, LTE, 5G, etc., thereby making it possible to stably use mobile communication. The UICC may be embedded with a communication application, such as a subscriber identification module (SIM), a universal SIM (USIM), an IP multimedia SIM (ISIM), etc., according to the type of a mobile communication network to which a subscriber connects. In addition, the UICC provides a high-level security function for loading various applications, such as an electronic wallet, ticketing, an electronic passport, etc.

A SIM card contains its unique serial number (ICCID), international mobile subscriber identity (IMSI) number, security authentication and ciphering information, temporary information related to the local network, a list of the services the user has access to, and passwords like: a personal identification number (PIN) for ordinary use, a personal unblocking code (PUK) for PIN unlocking, etc. Every network operator has a unique Public Land Mobile Network (PLMN) number. PLMN consists of the Mobile Country Code (MCC) and Mobile Network Code (MNC). Every subscriber of service provider operator is identified by a unique International Mobile Subscriber Identity (IMSI) which consists of the PLMN (MCC, MNC) of the service provider operator and the Mobile Subscription Identification Number (MSIN). The PLMN contained in the subscriber's IMSI is called Home PLMN (HPLMN) and the corresponding network is referred to as Home Network (HN) herein. When a subscriber of an operator tries to attach to another network operator due to various reasons like unavailability of home network, etc. it is identified as a Roaming Subscriber (RS) and that network operator is referred to as Roamed Network (RN) herein. The roaming subscriber can access the roamed network services as per the bilateral roaming agreements between the home and the roamed network operators.

Further, an eUICC (Embedded Universal Integrated Circuit Card) has been dubbed the next evolution of the SIM card, because it offers users the ability to change service provider over-the-air (OTA), without needing to physically change the embedded SIM card itself. The eUICC represents the most radical change in over two decades of GSM connectivity, in terms of how customers can select and change service provider profiles based on the criteria or business rules of their choosing.

Also, when talking about eUICC, people often mistakenly associate it with a SIM form factor (MFF or M2M Form Factor, i.e. chip embedded SIM), but the eUICC is not associated with such SIM form factor and the eUICC is configured to allow remote SIM provisioning of multiple network profiles. A traditional SIM is provisioned with a single profile that usually has 64 KB or 128 KB of memory.

The eUICC SIM (or MIM-Machine Identification Module) can host multiple profiles, features a very rich OS and requires a minimum memory of 512 KB. While eUICC has been around for a number of years in areas such as the connected car market, it has lacked standardization, making it difficult to change subscriptions over the air across a broad ecosystem of operators. It has become a more popular topic due to the growing popularity of embedded IoT devices and connected consumer electronics devices.

Further, a bootstrap profile is MNO1 profile that is usually pre-programed in the eUICC during eUICC manufacturing process and that profile is expected to have the lifelong connectivity of the device. This profile will act as a fallback profile in case of device loses connectivity while using the operational profile in case of network unavailability or termination of operational profile services, in such scenario the eUICC falls back to bootstrap profile to ensure connectivity to download another operational profile. The mobile network operator (MNO) will hold the standard sim configuration files which are required to authenticate and connect to the network. The Bootstrap profile shall be preloaded from factory and it will be used to download functional/operational profile to provide data connectivity. Also, an operational profile contains one or more network access applications and associated network access credentials and MNO's (e.g. STK) applications and 3rd party applications.

Also, an eSIM/eUICC must have an initial default method of talking to the outside world, which being inside an M2M device having a bootstrap profile may connect to a server (SM-SR) that controls the subscription on the device. Two servers are required in the case of an M2M application. One is called an SM-DP and the other is called an SM-SR. The SM-DP (Subscription Manager-Data Preparation) prepares the profile for download while the SM-SR (Subscription Manager-Secure Routing) routes the profile over the air into the SIM chip. At that point, an operational profile—with all the required features and functionality of network connectivity—can be provisioned, via the bootstrap. A bootstrap profile is imperative as it means that an eSIM embedded within an M2M device—or fleet of devices—on the Internet of Things needs no human interaction or maintenance. It can be managed entirely remotely.

Also, in mobile networks and particularly in 4G and 5G mobile networks, HTTP-OTA (HTTP=Hypertext Transfer Protocol, OTA=Over The Air) is a common technology to enable a remote management of the content stored in a UICC (Universal Integrated Circuit Card) or other secure elements.

Currently, there are three ways of initiating an HTTP-OTA session, namely:
1. HTTP-PUSH,
2. HTTP-POLL and
3. HTTP-PULL.

The most desirable mechanism is HTTP-PUSH where a remote service can initiate an update of the secure element by sending an SMS (Short Message Service) message to the secure element. However, due to the use of SMS, HTTP-PUSH may not be compatible with existing mobile networks because some mobile networks no longer enable SMS, or the use of SMS is only optional in those networks.

Also, according to the HTTP-PULL mechanism, the initiation of an HTTP-OTA session is coupled to a user input on the mobile device carrying the secure element. This has the disadvantage that the user who will not know about updates on the secure element needs to be involved in this process. According to the HTTP-POLL mechanism, the secure element initiates an HTTP-OTA session in regular or irregular time intervals by itself. In case of short polling intervals, this will result in a high battery consumption of the mobile device carrying the secure element.

Furthermore, a number of solutions are also developed in this area of technology such as a known art provides a solution for establishing an HTTP-OTA session between a secure element connected to a mobile device and an HTTP-OTA platform within a mobile network. Also, one other known art provides a solution for updating a profile management server to enable profile management using OTA technology when a modification is made to data stored in an MNO-SD that is a unique area of each mobile network operator of a profile stored in an eUICC.

Further, one of the known arts also provides a high-level client-server solution which includes an explanation for profile download and profile switching. Also, one other known solution enables a remote machine-to-machine device SIM profile management wherein, a network device stores multiple profile orders for secure elements of end devices and receives an unsolicited profile query from a secure element of an end device.

Furthermore, as per GSMA SGP.02 specifications, the M2M eUICC shall have the Bootstrap profile that is also called as provisioning profile. The purpose of Bootstrap profile is to provide connectivity to establish the HTTP tunnel to download the new operational profile that is allocated by MNO to device based on its activation and MSISDN is assigned to it. However, the drawback in the current scenario is that polling intervals may be prolonged, this leads to the disadvantage that there might be a long-time delay for updating the secure element based on HTTP-OTA. Also, there are few inherent challenges concerned with the conventional way of downloading profiles at M2M devices which are performed from different MNO's leading to the wastage of MSISDN while downloading profile from multiple MNO's.

Therefore, in the current system, there is a need for efficiently utilizing and saving MSISDN's while utilizing bootstrap profile and operational profile from the same MNO. Also, there is a need to provide a solution for remote profile provisioning where no MSISDN is assigned initially for bootstrap profile. Therefore, in view of these and other existing limitations, there is an imperative need to provide a solution to overcome the limitations of prior existing solutions and to provide methods and systems for remote profile provisioning.

SUMMARY OF THE DISCLOSURE

This section is provided to introduce certain objects and aspects of the present invention in a simplified form that are further described below in the detailed description. This summary is not intended to identify the key features or the scope of the claimed subject matter.

In order to overcome at least some of the drawbacks mentioned in the previous section and those otherwise known to persons skilled in the art, an object of the present disclosure is to provide a system for efficiently utilizing and saving MSISDN's while using bootstrap profile and operational profile from the same MNO (Mobile network operator). Another object of the present invention is to avoid a pre-assigned MSISDN for the bootstrap profile to avoid the wastage multiple MSISDN while downloading profile from same MNO's, wherein one MSISDN is saved for each M2M user. Also, another object of the present invention is to provide an M2M solution wherein the use of MSISDN for bootstrap profile can be saved as the bootstrap profile using a polling unit on a user device (M2M device) to reach out to SM-SR to download the MNO operational profile. Further, an object of the present invention is to save pre-assignment of MSISDNs to bootstrap profile of M2M device thereby saving millions of MSISDNs for MNOs resulting in significant reduction in operating cost and efforts. Another object of the present invention is to provide a solution for http download and notification in M2M IoT devices ecosystem, which does not support SMS as bearer. Yet another object of the present invention is to save the MSISDN for MNO making the profile download process simple, especially for MNO, managed devices with service multiple circles with different MNCs.

In order to achieve the aforementioned objectives, the present invention provides a method and system for remote subscriber identity module (SIM) profile provisioning in machine to machine (M2M)/Internet of Things (IoT) devices. A first aspect of the present invention relates to a method for remote profile provisioning. The method encompasses activating, via an embedded universal integrated circuit card (eUICC), a machine-to-machine (M2M) polling unit based on a limited connectivity for HTTP service enabled via a mobile network operator (MNO) at the eUICC, wherein the limited connectivity for HTTP service is enabled based on an activation of a bootstrap profile. Thereafter the method encompasses establishing, via the M2M polling unit, an HTTP channel between the eUICC and a subscription manager-secure routing (SM-SR). The method further comprises receiving, at the eUICC via a transceiver unit from the subscription manager-secure routing (SM-SR), an operational profile over the established HTTP channel. Thereafter the method encompasses retrieving, at the eUICC, the operational profile with at least a new mobile station international subscriber directory number (MSISDN). Further, the method comprises enabling, at the eUICC, the retrieved operational profile for remote SIM profile provisioning management.

Another aspect of the present invention relates to a system for remote profile provisioning. The system comprises an embedded universal integrated circuit card (eUICC), configured to activate, a machine-to-machine (M2M) polling unit based on a limited connectivity for HTTP service enabled via a mobile network operator (MNO) at the eUICC, wherein the limited connectivity for HTTP service is enabled based on an activation of a bootstrap profile. The system further comprises the M2M polling unit, configured to establish, an HTTP channel between the eUICC and a subscription manager-secure routing (SM-SR). Thereafter the system comprises a transceiver unit, configured to receive, at the eUICC from the subscription manager-secure routing (SM-SR), an operational profile over the established HTTP channel. Also, the eUICC is further configured to retrieve, the operational profile with at least a new mobile station international subscriber directory number (MSISDN) and also to enable, the retrieved operational profile for remote SIM profile provisioning management.

Yet another aspect of the present invention relates to an IoT device for remote profile provisioning. The IoT device comprises a system configured to activate, a machine-to-machine (M2M) polling unit based on a limited connectivity for HTTP service enabled via a mobile network operator (MNO) at an embedded universal integrated circuit card (eUICC), wherein the limited connectivity for HTTP service is enabled based on an activation of a bootstrap profile. Also, the bootstrap profile is activated without any MSISDN as no MSISDN is assigned to the bootstrap profile initially. Further, the system is configured to establish, an HTTP channel between the eUICC and a subscription manager-secure routing (SM-SR). Also, the system is thereafter configured to receive, at the eUICC from the subscription manager-secure routing (SM-SR), an operational profile over the established HTTP channel. The system is further configured to retrieve, the operational profile with at least a new mobile station international subscriber directory number (MSISDN). Also, the system is further configured to enable, the retrieved operational profile for remote SIM profile provisioning management.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

Figure 1:
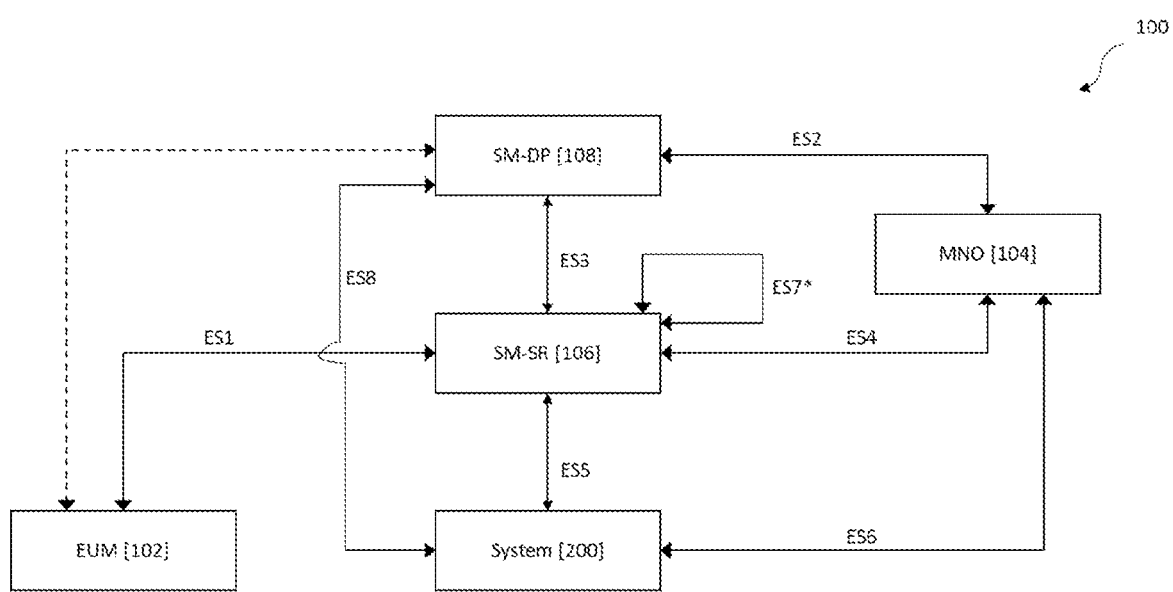
FIG. 1 illustrates an exemplary block diagram depicting a network architecture [100], in accordance with exemplary embodiments of the present invention.

The foregoing shall be more apparent from the following more detailed description of the disclosure.

DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a sequence diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As utilized herein, terms "component," "system," "platform," "node," "layer," "selector," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

Further, these components can execute from various computer-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software application or a firmware application executed by a processor, wherein the processor can be internal or external to the apparatus and executes at least a part of the software or firmware application. As yet another example, a component can be any apparatus that provides specific functionality through electronic components without mechanical parts, the electronic components can include a processor therein to execute software or firmware that confers at least in part the functionality of the electronic components.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

As used herein, the terms "(Internet of Things) IoT sensor device" or "IoT device" or "user device" or "device" or "machine to machine (M2M) device" or "user equipment (UE)" and/or the like are employed interchangeably throughout the subject specification and refers to any electrical, electronic, electromechanical and computing device having at least one SIM including but not limited to eUICC SIM installed on it. Also, the M2M device further may refer to any such device which may be obvious to a person skilled in the art and is capable of implementing the features of the present invention.

As used herein the "Transceiver Unit" may include but not limited to a transmitter to transmit data to one or more destinations and a receiver to receive data from one or more sources. Further, the Transceiver Unit may include any other similar unit obvious to a person skilled in the art, to implement the features of the present invention.

As used herein, "Storage Unit" or "Memory Unit" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

Hereinafter, exemplary embodiments of the present disclosure will be described in detail with reference to the accompanying drawings so that those skilled in the art can easily carry out the present disclosure.

The present invention provides a solution for remote SIM profile provisioning in machine to machine (M2M)/Internet of Things (IoT) devices. The present invention encompasses using a machine-to-machine (M2M) polling unit to provide a solution for provisioning and downloading a Mobile Network Operator (MNO) operational profile on any SIM including but not limited to eUICC SIM. Furthermore, the present invention encompasses the use of activation of a bootstrap profile without a mobile station international subscriber directory number (MSISDN) and an activation of the M2M polling unit via an embedded universal integrated circuit card (eUICC), to reach out to a subscription manager-secure routing (SM-SR) server, in order to download an MNO operational profile, rather than waiting for an SMS based ES5 trigger from the SM-SR, which not only saves an additional MSISDN for the MNO but also makes the profile download process simple, especially for MNO, managed devices with multiple service circles with different MNCs. The present invention encompasses reaching out to SM-SR for downloading the MNO operational profile over an ES8 interface, wherein the ES8 interface is an interface between a Subscription Manager-Data Preparation (SM-DP) and the eUICC and used to download an actual profile on the eUICC. Also, in an implementation, function of the SM-DP is to prepare a profile for download and also function of the SM-SR is to route the profile over the air into a SIM chip/eUICC. Furthermore, the present invention encompasses activating the bootstrap profile in one of an event where a device comprising an eUICC/eSIM is powered on and such eUICC is a new fresh eUICC card and only the bootstrap profile is available profile on it and in one other event where the powered on device is a refurbished device comprising an eUICC with bootstrap profile enabled by a service centre after the device is repaired and therefore only the bootstrap profile is available profile on it. Further, the implementation of the features of the present invention encompasses handling of the profile download from the SM-SR, wherein from an MNO IT end, the bootstrap profile will be enabled with wall garden policy and will always remain active. Furthermore, the implementation of the features of the present invention enables the eUICC to reach to the SM-SR for downloading over the ES8 interface, the operational profile with an MSISDN assignment for bootstrap profile for initial profile download with a use of ES5 trigger from the SM-SR rather than the conventional SMS.

Therefore, the present invention provides a solution to enable the eUICC to reach to the SM-SR for downloading an operational profile with an MSISDN assignment for bootstrap profile for initial profile download with use of ES5 trigger from the SM-SR rather than a conventional SMS. Also, the present invention, therefore, provides a solution for efficiently utilizing and saving MSISDN's while using bootstrap profile and operational profile from the same MNO (Mobile network operator), using both profiles from the same MNO wherein, the use of MSISDN for bootstrap profile can be saved as the bootstrap profile is using the M2M polling unit on a user device/M2M device to reach out to the SM-SR in order to download the MNO operational profile over the ES8 interface, rather than waiting for SMS based ES5 trigger from SM-SR.

The present invention is further explained in detail below with reference now to the diagrams.

Referring to FIG. 1, an exemplary block diagram depicting a network architecture [100], in accordance with exemplary embodiments of the present invention. The network architecture as disclosed in the FIG. 1 depicts an exemplary high-level signaling block diagram of an end-to-end remote SIM provisioning and management network architecture. As shown in FIG. 1, an eUICC Manufacturer (EUM) [102] is connected to a Subscription Manager Secure Routing server (SM-SR) [106] over an ES1 interface. The SM-SR [106] is further connected to a mobile network operator (MNO) [104] over an ES4 interface and also the SM-SR [106] is connected to a Subscription Manager Data Preparation server (SM-DP) [108] and also to a system [200], over an ES3 interface and an ES5 interface respectively. The SM-DP [108] is further connected to the MNO [104] over an ES2 interface and also the SM-DP [108] is connected to the system [200] over an ES8 interface. Also, FIG. 1 indicates an ES7 interface at the SM-SR [106]. Furthermore, the system [200] may be implemented at a machine (M2M)/Internet of Things (IoT) device and is configured to implement the features of the present invention to provide remote SIM profile provisioning and management.

Further, in an example some of the details of the modules/units and their interaction interfaces, of the exemplary network architecture in accordance with exemplary embodiments of the present invention is depicted below in Table 1.

TABLE 1

| Interface | Function group | Functions | Function provider Role |
|---|---|---|---|
| ES1 | eUICC Management | Register EIS | SM-SR |
| ES2 | Profile Management | Get EIS Download Profile Update Policy Rules Update Subscription Address | SM-DP |
| ES2 | Platform Management | Enable Profile Disable Profile Delete Profile | SM-DP |
| ES3 | Profile Management | Get EIS Audit EIS Create ISDP Send Data Profile Download Completed Update Policy Rules Update Subscription Address Update Connectivity Parameters | SM-SR |
| ES3 | Platform Management | Enable Profile Disable Profile Delete ISDP | SM-SR |
| ES4 | Profile Management | Get EIS Update Policy Rules Update Subscription Address Audit EIS | SM-SR |
| ES4 | Platform Management | Enable Profile Disable Profile Delete Profile | SM-SR |

TABLE 1-continued

| Interface | Function group | Functions | Function provider Role |
|---|---|---|---|
| ES4 | eUICC Management | Prepare SMSR Change SMSR change | SM-SR |
| ES7 | eUICC Management | Create Additional Key Set Handover EUICC Authenticate SMSR | SM-SR |

Furthermore, as the present invention provides a solution for remote SIM profile provisioning where a mobile station international subscriber directory number (MSISDN) is not assigned to a bootstrap profile at the M2M device, therefore in the absence of an ES5 use over SMS as MSISDN is not available, the system [200] of the present invention is configured to reach out to the SM-SR [106] for downloading with a use of ES5 trigger from SM-SR, an operational profile over ES8 interface without using the MSISDN. Furthermore, in an event when the M2M device is powered on the system [200] connects to the SM-SR platform [106] (using an HTTP connection) to fetch and download an operational profile having an MSISDN. The system [200] uses the HTTP channel as a priority over SMS for notification from the M2M device to the SM-SR [106] for both the Operational and Bootstrap profile. Further, the implementation of the system [200] in an exemplary network architecture for remote profile provisioning is explained in detail with reference to the FIG. 2.

Figure 2:
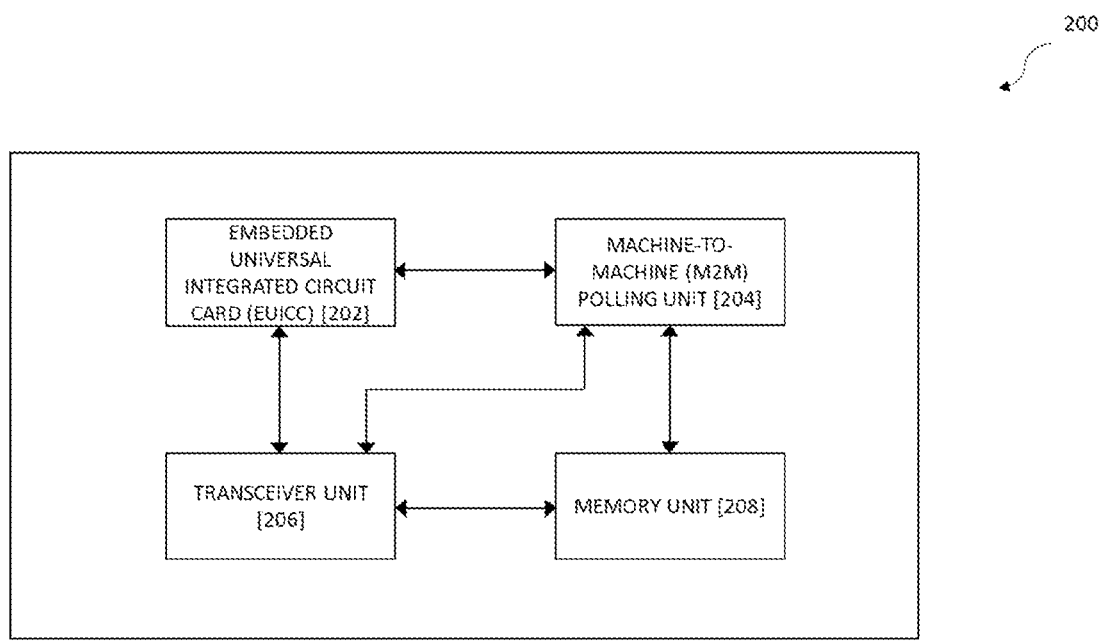
FIG. 2 illustrates an exemplary block diagram of a system [200], for remote profile provisioning, in accordance with exemplary embodiments of the present invention.

Referring to FIG. 2, an exemplary block diagram of a system [200], for remote profile provisioning, in accordance with exemplary embodiments of the present invention is shown. The system [200] comprises at least one embedded universal integrated circuit card (eUICC) [202], at least one machine-to-machine (M2M) polling unit [204], at least one transceiver unit [206] and at least one memory unit [208]. In an instance the system is implemented at a machine-to-machine (M2M) device and is connected to various units such as including but not limited to a Subscription Manager Secure Routing server (SM-SR) [106], a Subscription Manager Data Preparation server (SM-DP) [108], a mobile network operator [104] and any such other unit which may be required to implement the features of the present invention and is obvious to a person skilled in the art. Also, all of the components/units of the system [200] are assumed to be connected to each other unless otherwise indicated below. Also, in FIG. 2 only a few units are shown, however, the system [200] may comprise multiple such units or the system [200] may comprise any such numbers of said units, obvious to a person skilled in the art or as required to implement the features of the present disclosure. The system [200], is configured for remote profile provisioning at M2M device/s, with the help of the interconnection between the components/units of the system [200].

The at least one embedded universal integrated circuit card (eUICC) [202] is connected to the at least one machine-to-machine (M2M) polling unit [204], the at least one transceiver unit [206] and the at least one memory unit [208]. In an instance, the embedded universal integrated circuit card (eUICC) [202] may refer to a hardware unit/card implemented at an M2M device and is configured to establish a connectivity between the M2M device and a network operator. The embedded universal integrated circuit card (eUICC) [202] is configured to activate, the machine-to-machine (M2M) polling unit [204] based on a limited connectivity for HTTP service enabled via the mobile network operator (MNO) at the eUICC [202], wherein the limited connectivity for HTTP service is enabled based on an activation of a bootstrap profile. The bootstrap profile is activated without a mobile station international subscriber directory number (MSISDN). The enabling of the limited connectivity for HTTP service is further based on activation of the bootstrap profile with a wall garden policy, by the MNO [104]. Also, in order to activate the M2M polling unit [204], via the eUICC [202], the transceiver unit [206] is configured to transmit from the eUICC [202] to a home subscriber server (HSS), a connection request based on a set of provisioning profile parameters. The set of provisioning profile parameters comprises bootstrap profile parameters, wherein these bootstrap profile parameters are pre-programed in the eUICC [202] during eUICC manufacturing process. For instance, in an event an M2M device comprising the system [200] is powered on with pre-programed bootstrap profile parameters, wherein no mobile station international subscriber directory number (MSISDN) is assigned to such pre-programed bootstrap profile parameters. The transceiver unit [206] in such event in order to activate the M2M polling unit [204] via the eUICC [202], transmits from the eUICC [202] to the home subscriber server (HSS), a connection request based on the bootstrap profile parameters. Thereafter, upon receipt of such connection request the MNO [104] initiates a Download Request to SM-DP [108] and once a successful ACK received from the SM-DP [108] to the MNO [104], the MNO [104] enables a limited connectivity for HTTP service through a wall garden policy on the eUICC [202]. Therefore the eUICC [202] is now able to reach few whitelisted IPs for http data download, over the limited connectivity for HTTP service. Further, once the limited connectivity for HTTP service through wall garden policy is enabled on the eUICC [202], the eUICC [202] activates the machine-to-machine (M2M) polling unit [204].

Further, the at least one M2M polling unit [204] is connected to the at least one embedded universal integrated circuit card (eUICC) [202], the at least one transceiver unit [206] and the at least one memory unit [208]. The M2M polling unit [204] is configured to establish, an HTTP channel between the eUICC [202] and the subscription manager-secure routing (SM-SR) [106]. Furthermore, in order to establish the HTTP channel between the eUICC [202] and the subscription manager-secure routing (SM-SR) [106], the M2M polling unit [204] initiates a request for opening of the HTTP channel from the eUICC [202] to the SM-SR [106]. In an instance, the M2M polling unit [204] is configured to periodically initiate the request for opening of the HTTP channel from the eUICC [202] to the SM-SR [106], until the HTTP channel is established between the eUICC [202] and the SM-SR [106].

Further, the at least one transceiver unit [206] is connected to the at least one embedded universal integrated circuit card (eUICC) [202], the at least one machine-to-machine (M2M) polling unit [204] and the at least one memory unit [208]. Thereafter, once the HTTP channel is established between the eUICC [202] and the subscription manager-secure routing (SM-SR) [106], the transceiver unit [206] in such event is configured to receive, at the eUICC [202] from the subscription manager-secure routing (SM-SR) [106], an operational profile over the established HTTP channel. Also, in an instance, the operational profile is received on the eUICC [202] based on a pull mechanism, wherein the pull mechanism works based on the activation of the bootstrap profile. Further, the operational profile is received on the eUICC [202] with at least a new/fresh mobile station international subscriber directory number (MSISDN). Also, in an instance, the received operational profile is further stored at the memory unit [208], and in an implementation the at least one memory unit [208] of the system [200] is connected to each unit of the system [200].

Thereafter, the eUICC [202] is further configured to retrieve, the operational profile with at least the new mobile station international subscriber directory number (MSISDN). Also, the eUICC [202] is thereafter configured to enable, the retrieved operational profile for remote SIM profile provisioning management at the M2M device. Furthermore, the enabled retrieved operational profile at the eUICC [202] thereafter enables the MNO [104] to transmit to the subscription manager-data preparation (SM-DP) [108], a subscription address update request, to update the new MSISDN. For instance, the MNO [104] initiates towards the SM-DP [108], ES2.UpdateSubscriptionAddress, based on the enabled retrieved operational profile with the new/fresh mobile station international subscriber directory number (MSISDN). Also, after updating the MSISDN, the M2M device is reachable by the SM-SR [106] for further profile download by push mechanism as well.

Also, the M2M polling unit [204] is thereafter configured to terminate a communication between the eUICC [202] and the SM-SR [106] based on at least one of the enabled retrieved operational profile at the eUICC [202] and a disabled bootstrap profile. For instance, once the operational profile is downloaded and enabled, and the bootstrap profile is disabled then there is no further communication between the eUICC [202] and the SM-SR [106].

Furthermore, in an instance, the features of the present invention may be implemented in an event where an M2M device comprising the system [200], is a refurbished device. Also, in such refurbished device a bootstrap profile is enabled at factory/service centre and the bootstrap profile can be used to download new functional/operational profile by a new owner of the refurbished device. Also, said enabled bootstrap profile is not associated with any mobile station international subscriber directory number (MSISDN), i.e. initially no MSISDN is present at the M2M device.

Also, the features of the present invention may be implemented in one other scenario where M2M device comprising the system [200], is a new device and only bootstrap profile is available on eUICC card at the M2M device. In this given scenario also the bootstrap profile is not associated with any mobile station international subscriber directory number (MSISDN), i.e. initially no MSISDN is present at the M2M device.

Therefore, the system [200] of the present invention provides remote SIM profile provisioning at the M2M device/s, in an event when no MSISDN is assigned to the bootstrap profile. Furthermore, the system [200] in order to provide the remote SIM profile provisioning establishes an http connectivity/channel between the eUICC [202] at the M2M device and the SM-SR [106], based on the activation of the machine-to-machine (M2M) polling unit [204].

Figure 3:
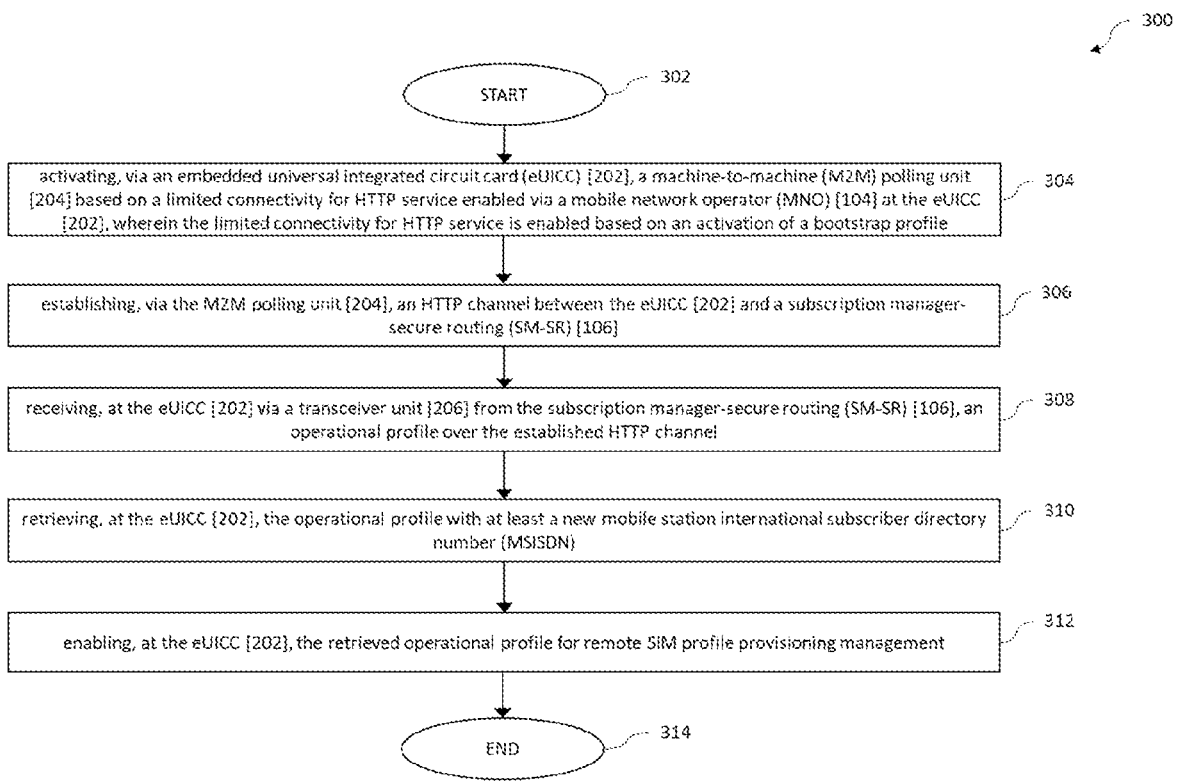
FIG. 3 illustrates an exemplary method flow diagram depicting a method [300], for remote profile provisioning, in accordance with exemplary embodiments of the present invention.

Referring to FIG. 3, an exemplary method flow diagram depicting a method [300], for remote profile provisioning, in accordance with exemplary embodiments of the present invention is shown. In an instance the method is implemented at an M2M device, wherein the M2M device is connected to various units such as including but not limited to a Subscription Manager Secure Routing server (SM-SR) [106], a Subscription Manager Data Preparation server (SM-DP) [108], a mobile network operator [104] and any such other unit which may be required to implement the features of the present invention and is obvious to a person skilled in the art. As shown in FIG. 3, the method begins at step [302].

At step [304], the method comprises activating, via an embedded universal integrated circuit card (eUICC) [202], a machine-to-machine (M2M) polling unit [204] based on a limited connectivity for HTTP service enabled via a mobile network operator (MNO) [104] at the eUICC [202], wherein the limited connectivity for HTTP service is enabled based on an activation of a bootstrap profile. The bootstrap profile is activated without a mobile station international subscriber directory number (MSISDN). The enabling of the limited connectivity for HTTP service is further based on activation of the bootstrap profile with a wall garden policy, by the MNO [104]. Also, the activating, via an embedded universal integrated circuit card (eUICC) [202], a machine-to-machine (M2M) polling unit [204] is also based on transmitting, from the eUICC [202] to a home subscriber server (HSS), a connection request based on a set of provisioning profile parameters. The set of provisioning profile parameters comprises bootstrap profile parameters, wherein these bootstrap profile parameters are pre-programed in the eUICC [202] during eUICC manufacturing process. Also, in an instance, the embedded universal integrated circuit card (eUICC) [202] may refer to a hardware unit/card implemented at the M2M device for establishing a connectivity between the M2M device and a network operator. For example, if in an event an M2M device is powered on with pre-programed bootstrap profile parameters, wherein no mobile station international subscriber directory number (MSISDN) is assigned to such pre-programed bootstrap profile parameters. The method in such event in order to activate the M2M polling unit [204] via the eUICC [202], transmits from the eUICC [202] to the home subscriber server (HSS), a connection request based on the bootstrap profile parameters. Thereafter, upon receipt of such connection request the MNO [104] initiates a Download Request to SM-DP [108] and once a successful ACK received from the SM-DP [108] to the MNO [104], the MNO [104] enables a limited connectivity for HTTP service through a wall garden policy on the eUICC [202]. Therefore the eUICC [202] is now able to reach few whitelisted IPs for http data download, over the limited connectivity for HTTP service. Further, once the limited connectivity for HTTP service through wall garden policy is enabled on the eUICC [202], the method encompasses activating via the eUICC [202], the machine-to-machine (M2M) polling unit [204] based on such limited connectivity for HTTP service.

Thereafter, the method at step [306] comprises establishing, via the M2M polling unit [204], an HTTP channel between the eUICC [202] and a subscription manager-secure routing (SM-SR) [106]. Furthermore, in order to establish the HTTP channel between the eUICC [202] and the subscription manager-secure routing (SM-SR) [106], the method encompasses initiating via the M2M polling unit [204], a request for opening of the HTTP channel from the eUICC [202] to the SM-SR [106]. In an instance, the method comprises initiating periodically via the M2M polling unit [204], the request for opening of the HTTP channel from the eUICC [202] to the SM-SR [106], until the HTTP channel is established between the eUICC [202] and the SM-SR [106].

Further, once the HTTP channel is established between the eUICC [202] and the subscription manager-secure routing (SM-SR) [106], the method at step [308] comprises receiving, at the eUICC [202] via a transceiver unit [206] from the subscription manager-secure routing (SM-SR) [106], an operational profile over the established HTTP channel. Also, in an instance, the operational profile is received on the eUICC [202] on the basis of a pull mechanism, wherein the pull mechanism works based on the activation of the bootstrap profile. Further, the operational profile is received on the eUICC [202] with at least a new/fresh mobile station international subscriber directory number (MSISDN).

Thereafter, the method at step [310] comprises retrieving, at the eUICC [202], the operational profile with at least the new mobile station international subscriber directory number (MSISDN). Also, the method thereafter at step [312] comprises enabling, at the eUICC [202], the retrieved operational profile for remote SIM profile provisioning management. Also, the enabling of the retrieved operational profile at the eUICC [202], further comprises enabling the MNO [104] to transmit to a subscription manager-data preparation (SM-DP) [108], a subscription address update request, to update the new MSISDN. In an example, the MNO [104] initiates towards the SM-DP [108] over the ES2 interface, an ES2.UpdateSubscriptionAddress, based on the enabled retrieved operational profile with the new/fresh mobile station international subscriber directory number (MSISDN). Also, after updating the MSISDN, the M2M device is reachable by the SM-SR [106] for further profile download by push mechanism as well.

Also, the method further comprises terminating a communication between the eUICC [202] and the SM-SR [106] based on at least one of the enabling of the retrieved operational profile at the eUICC [202] and a disabling of the bootstrap profile. For instance, once the operational profile is downloaded and enabled, and the bootstrap profile is disabled then there is no further communication between the eUICC [202] and the SM-SR [106].

Furthermore, the features of the present invention may be implemented via the method in an event the M2M device upon which the method is being implemented is one of a new and a refurbished device, such that only bootstrap profile is available on eUICC card at the M2M device and initially no MSISDN is present at the M2M device. The method thereafter terminates at step [314].

Furthermore, an aspect of the present invention relates to an IoT device for remote profile provisioning. The IoT device comprises a system [200] configured to activate, a machine-to-machine (M2M) polling unit [204] based on a limited connectivity for HTTP service enabled via a mobile network operator (MNO) at an embedded universal integrated circuit card (eUICC) [202], wherein the limited connectivity for HTTP service is enabled based on an activation of a bootstrap profile. Also, the bootstrap profile is activated without any MSISDN as no MSISDN is assigned to the bootstrap profile initially. Further, the system [200] is configured to establish, an HTTP channel between the eUICC [202] and a subscription manager-secure routing (SM-SR) [106]. Also, the system [200] is thereafter configured to receive, at the eUICC [202] from the subscription manager-secure routing (SM-SR) [106], an operational profile over the established HTTP channel. The system is further configured to retrieve, the operational profile with at least a new mobile station international subscriber directory number (MSISDN). Also, the system [200] is further configured to enable, the retrieved operational profile for remote SIM profile provisioning management.

Figure 4:
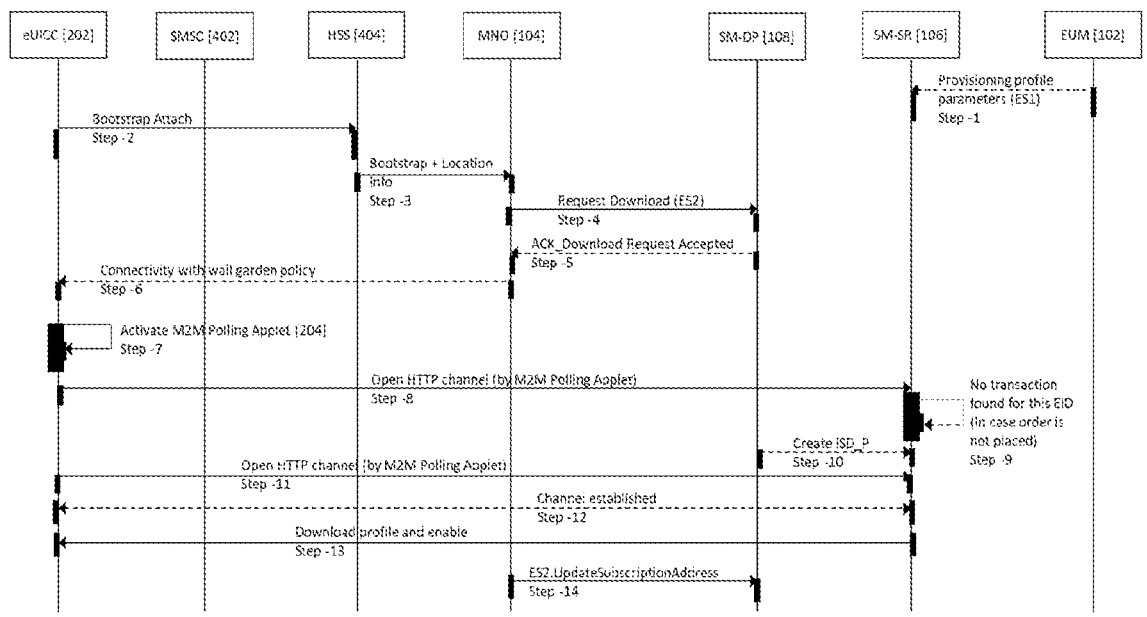
FIG. 4 illustrates an exemplary flow diagram, depicting an instance implementation of the process of remote profile provisioning, in accordance with exemplary embodiments of the present invention.

Referring to FIG. 4 an exemplary flow diagram, depicting an instance implementation of the process of remote profile provisioning, in accordance with exemplary embodiments of the present invention is shown.

At step 1 the method encompasses importing bootstrap profile related parameters (i.e. provisioning profile parameters) from the EUM [102] to the SM-SR [106] as part of an eUICC Information Set (EIS) data, through the ES1 interface.

Next, at step 2 the method encompasses transmitting a Bootstrap Attach from the eUICC [202] to the HSS [404], in an event when an M2M device is Powered ON with Bootstrap credentials (i.e. the bootstrap profile related parameters), thereby the M2M device gets attached to the HSS [404] when the powered-ON notification is relayed to the MNO [104]. Also, the Bootstrap credentials at the M2M device are not associated with any MSISDN.

Next, at step 3 the method encompasses transmitting from the HSS [404] to the MNO [104], a Bootstrap+Location Info indication.

Next, at step 4 the method encompasses sending from the MNO [104] to the SM-DP [108] a Request Download (ES2) indication. More specifically, the MNO [104] initiates a Download Request to the SM-DP [108] on ES2 interface with EID (Embedded UICC ID), ICCID (Integrated Circuit Card Identifier) or Profile Type and Enable=True.

Next, at step 5 the method encompasses receiving an ACK_Download Request Accepted indication from the SM-DP [108] to the MNO [104] (i.e. a successful ACK is received from the SM-DP [108] to the MNO [104]).

Next, at step 6 the method encompasses enabling a connectivity with wall garden policy at the eUICC [202] via the MNO [104]. For instance, once the successful ACK is received from the SM-DP [108] to the MNO [104], the MNO [104] enables a limited connectivity for HTTP service through a wall garden policy on the eUICC [202]. The eUICC [202] therefore will be able to reach few whitelisted IPs for http data download based on such limited connectivity for HTTP service.

Next, at step 7 the method encompasses activating an M2M Polling unit [204] via the eUICC [202] at the M2M device, to initiate an http session with the SM-SR [106].

Next, at step 8 the method encompasses transmitting an open HTTP channel request by the M2M Polling unit [204] to the SM-SR [106]. The, M2M Polling unit [204] at the step 8, requests for opening of the HTTP channel from eUICC [202] to SM-SR [106].

Next, at step 9, an exemplary scenario is depicted where no transaction is found for said EID (for instance in case an order is not placed), and therefore in such instance the request for opening the HTTP channel from the eUICC [202] is initiated before the order is placed for this eUICC [202], hence it will be rejected.

Next, at step 10 the method encompasses transmitting a create ISD_P request from the SM-DP [108] to the SM-SR [106].

Next, at step 11, as part of retry mechanism, the method encompasses retransmitting the request for opening the HTTP channel from the eUICC [202] to the SM-SR [106], by the M2M Polling unit [204]. The method encompasses retransmitting the request for opening the HTTP channel from the eUICC [202] to the SM-SR [106], until said channel is established.

Next, at step 12 the method encompasses establishing the HTTP Channel between the eUICC [202] and the SM-SR [106] for remote profile provisioning.

Next, at step 13 the method encompasses downloading and enabling of an operational profile over the established HTTP channel via a pull mechanism based on activation of the bootstrap profile, wherein the operational profile is downloaded and enabled with at least a new/fresh MSISDN.

Next, at step 14 the method encompasses initiating from the MNO [104] towards the SM-DP [108], an ES2.UpdateSubscriptionAddress indication to update the new MSISDN to the SM-SR [106] using ES2 interface. Also, the new MSISDN is thereafter updated in EIS data. After updating the new MSISDN into the SM-SR EIS data, the M2M device becomes reachable by the SM-SR [106] for further profile download by push mechanism as well.

Figure 5:
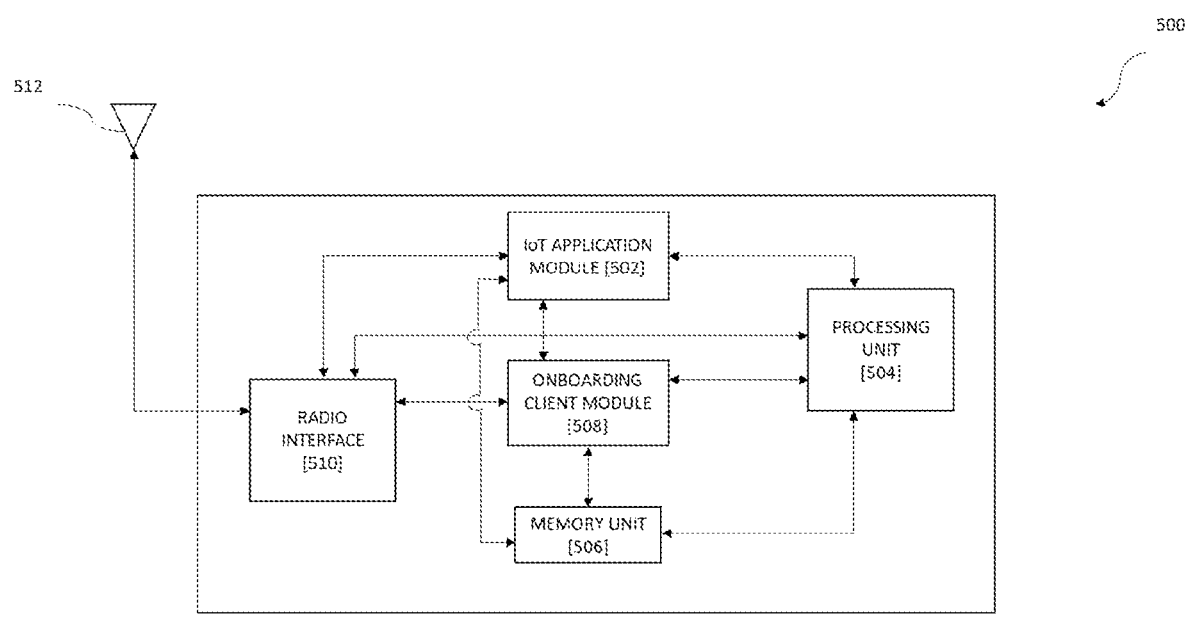
FIG. 5 illustrates an exemplary block diagram of an IoT device [500], in accordance with exemplary embodiments of the present disclosure.

Referring to FIG. 5, an exemplary IoT device [500], in accordance with exemplary embodiments of the present disclosure is shown. The IoT device [500] comprises at least one radio interface [510], at least one antenna [512], at least one IoT application module [502], at least one memory unit [506], at least one on-boarding client module [508] and at least one processing unit [504], said components being connected to each other. Furthermore, in an exemplary implementation, the system [200] of the present invention is implemented at the IoT device [500] (not shown in the FIG. 4), for remote (subscriber identity module) SIM profile provisioning management at the IoT device [500].

Further the radio interface [510] and the antenna [512] of the IoT device [500] are configured to enable a wireless communication over an IoT network to implement the features of the present invention. The IoT application module [502] is a primary IoT application module configured to implement primary IoT functionality in combination with multiple hardware and software components. The IoT application module [502] communicates over the desired IP network via the radio interface [510].

The on-boarding client module [508] is configured to communicate to one or more onboarding servers via the radio interface [510] and is in charge of device-specific onboarding function. Furthermore, both the IoT application module [502] and the on-boarding client module [508] are configured to interact with the memory unit [506] for storage management. Also, all units/modules present at the IoT device [500] are configured to use the processing unit [504] to execute their respective functions.

Thus, the present invention provides a novel solution for the technical problem of prolonged polling intervals causing a long-time delay for updating secure element based on HTTP-OTA. Also, the present invention provides a novel solution to download and enable operational/functional profiles in scenarios where no MSISDN is assigned to bootstrap profile. Furthermore, the present invention encompasses the implementation of an M2M polling unit at a user device (M2M/IoT device) as a part of ISD-R, which enables the eUICC to reach to the SM-SR for downloading over an ES8 interface, the operational profile with the MSISDN assignment for bootstrap profile for initial profile download with the use of ES5 trigger from SM-SR rather than the conventional SMS. Thus the present invention provides a solution of efficiently utilizing and saving MSISDN's while using bootstrap profile and operational profile from the same MNO (Mobile network operator), using both profiles from the same MNO wherein, the use of MSISDN for bootstrap profile can be saved as the bootstrap profile is using the M2M polling unit on the user device to reach out to SM-SR in order to download the MNO operational profile.

While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

We claim:

1. A method for remote profile provisioning, the method comprising:
activating, at an embedded universal integrated circuit card (eUICC), a bootstrap profile upon powering on of a machine-to-machine (M2M) device comprising the eUICC, wherein the bootstrap profile is associated with a set of provisioning profile parameters that comprises bootstrap profile parameters, wherein the bootstrap profile parameters are pre-programmed into the eUICC without a mobile station international subscriber directory number (MSISDN) assigned thereto;
activating, via the eUICC, a machine-to-machine (M2M) polling unit based on a limited connectivity for HTTP service enabled via a mobile network operator (MNO) at the eUICC, wherein the limited connectivity for HTTP service is enabled based on the activation of the bootstrap profile;
establishing, via the M2M polling unit, an HTTP channel between the eUICC and a subscription manager-secure routing (SM-SR);
receiving, at the eUICC via a transceiver unit from the subscription manager-secure routing (SM-SR), an operational profile over the established HTTP channel;
retrieving, at the eUICC, the operational profile with at least a new mobile station international subscriber directory number (MSISDN); and
enabling, at the eUICC, the retrieved operational profile for remote SIM profile provisioning management.

2. The method as claimed in claim 1, wherein the activating, via an embedded universal integrated circuit card (eUICC), a machine-to-machine (M2M) polling unit is further based on transmitting, from the eUICC to a home subscriber server (HSS), a connection request based on a set of provisioning profile parameters associated with the activated bootstrap profile.

3. The method of claim 2, wherein the limited connectivity for HTTP service is enabled based on a download request sent by the MNO upon receiving, by the MNO, a bootstrap location information indication from the HSS in response to the connection request transmitted from the eUICC to the HSS.

4. The method as claimed in claim 1, wherein the bootstrap profile is activated without the mobile station international subscriber directory number (MSISDN).

5. The method as claimed in claim 1, wherein the enabling, at the eUICC, the retrieved operational profile further comprises enabling the MNO to transmit to a subscription manager-data preparation (SM-DP), a subscription address update request, to update the new MSISDN.

6. The method as claimed in claim 1, the method further comprising terminating a communication between the eUICC and the SM-SR based on a disabling of the bootstrap profile.

7. The method of claim 1, further comprising initiating, by the MNO, a download request to a subscription manager-data preparation (SM-DP) on ES2 interface with Embedded UICC ID (EID), Integrated Circuit Card Identifier (ICCID), or Profile Type.

8. The method of claim 1, wherein the limited connectivity for HTTP service is enabled through a wall garden policy on the eUICC.

9. The method of claim 1, wherein the limited connectivity for HTTP service is enabled based on an acknowledgement received by the MNO from a subscription manager-data preparation (SM-DP) in response to a download request sent by the MNO to the subscription manager-data preparation (SM-DP).

10. A system for remote profile provisioning, the system comprising:
an embedded universal integrated circuit card (eUICC), configured to:
activate a bootstrap profile upon powering on of the system, wherein the bootstrap profile is associated with a set of provisioning profile parameters that comprises bootstrap profile parameters, wherein the bootstrap profile parameters are pre-programmed into the eUICC without a mobile station international subscriber directory number (MSISDN) assigned thereto;
activate, a machine-to-machine (M2M) polling unit based on a limited connectivity for HTTP service enabled via a mobile network operator (MNO) at the eUICC, wherein the limited connectivity for HTTP service is enabled based on the activation of the bootstrap profile;
the M2M polling unit comprising a processor and a memory storing instructions, which when executed by the processor, cause the M2M polling unit to:
establish, an HTTP channel between the eUICC and a subscription manager-secure routing (SM-SR); and
a transceiver, configured to receive, at the eUICC from the subscription manager-secure routing (SM-SR), an operational profile over the established HTTP channel;
wherein the eUICC is further configured to:
retrieve, the operational profile with at least a new mobile station international subscriber directory number (MSISDN), and
enable, the retrieved operational profile for remote SIM profile provisioning management.

11. The system as claimed in claim 10, wherein to activate the M2M polling unit via the eUICC, the transceiver is further configured to transmit from the eUICC to a home subscriber server (HSS), a connection request based on a set of provisioning profile parameters.

12. The system as claimed in claim 10, wherein the enabled retrieved operational profile at the eUICC further enables the MNO to transmit to a subscription manager-data preparation (SM-DP), a subscription address update request, to update the new MSISDN.

13. The system as claimed in claim 10, the M2M polling unit is further configured to terminate a communication between the eUICC and the SM-SR based on at least one of the enabled retrieved operational profile at the eUICC and a disabled bootstrap profile.

* * * * *